United States Patent [19]

Ikeda

[11] Patent Number: 4,648,266
[45] Date of Patent: * Mar. 10, 1987

[54] IGNITION TIMING SENSOR SYSTEM FOR A SWIRL CHAMBER TYPE DIESEL ENGINE

[75] Inventor: Shinji Ikeda, Susono, Japan

[73] Assignee: Toyota Jidosha Kabushiki Kaisha, Japan

[ * ] Notice: The portion of the term of this patent subsequent to Feb. 25, 2003 has been disclaimed.

[21] Appl. No.: 605,189

[22] Filed: Apr. 30, 1984

[30] Foreign Application Priority Data

Feb. 10, 1984 [JP] Japan .............................. 59-16793[U]

[51] Int. Cl.⁴ .......................................... G01M 15/00
[52] U.S. Cl. ............................................... 73/117.3
[58] Field of Search ............. 73/119 A, 119 R, 117.3, 73/35; 123/425, 478, 480, 289, 145 A

[56] References Cited

U.S. PATENT DOCUMENTS

| | | | |
|---|---|---|---|
| 4,227,402 | 10/1980 | Dooley et al. | 73/119 A |
| 4,373,384 | 2/1983 | Olson et al. | 73/119 A |
| 4,413,509 | 11/1983 | Moser et al. | 73/35 |
| 4,441,021 | 4/1984 | Olson et al. | 73/117.3 |
| 4,444,043 | 4/1984 | Hattori et al. | 73/35 |
| 4,483,289 | 11/1984 | Paul et al. | 123/289 |
| 4,572,119 | 2/1986 | Ikeda | 123/145 A |

FOREIGN PATENT DOCUMENTS 0051268 3/1983 Japan .............................. 73/119 A Primary Examiner—Jerry W. Myracle
Assistant Examiner—Robert R. Raevis
Attorney, Agent, or Firm—Finnegan, Henderson, Farabow, Garrett & Dunner

[57] ABSTRACT

An injection timing sensor system for a Diesel engine comprises an optical conductor which transmits combustion light produced by the combustion of fuel in a swirl chamber of the engine. The sensor is positioned on the opposite side of an injection nozzle from a glow plug and has an input end retracted into the wall surface of the swirl chamber so that no burnt gas collides against the input end, resulting in few deposits accumulating on the input end.

3 Claims, 4 Drawing Figures

IGNITION TIMING SENSOR SYSTEM FOR A SWIRL CHAMBER TYPE DIESEL ENGINE

BACKGROUND OF THE INVENTION

1. Field of the Invention

The present invention relates to a swirl chamber type Diesel engine and more particularly to an ignition timing sensor for a swirl chamber type Diesel engine.

2. Description of the Prior Art

An ignition timing sensor detects the ignition timing of a Diesel engine from combustion light in a swirl chamber. To prevent the input end of the ignition timing sensor from being covered with deposits due to the combustion of fuel containing a large amount of sulfur(S) the ignition timing sensor is separated from the glow plug, the glow portion of which is in a location directly contacting the injection fuel. The ignition timing sensor is mounted on the opposite side of the glow plug with respect to the fuel injection nozzle, i.e., where the injection fuel from the fuel injection nozzle will not contact directly said sensor. In the prior art Diesel engines, however, the input end of the ignition timing sensor projects from the wall surface of the swirl chamber. In such Diesel engines using low octane number fuel and having EGR (Exhaust Gas Recirculation), deposits may be formed gradually on the input end and reduce the luminous intensity detected by the ignition timing sensor with the passage of time.

SUMMARY OF THE INVENTION

An object of the present invention is to provide a swirl chamber type Diesel engine which restrains the formation of fuel and combustion deposits on the end of an ignition timing sensor to ensure that a predetermined luminous intensity will be detected by the ignition timing sensor.

According to the present invention to achieve this object, in the swirl chamber type Diesel engine comprising a glow portion of a glow plug provided in a location contacting directly the injection fuel from a fuel injection nozzle and an ignition timing sensor mounted at the side opposite to the glow plug with respect to the fuel injection nozzle to detect the ignition timing from combustion light in the swirl chamber, the input end of the ignition timing sensor is located on the wall surface of the swirl chamber or in a position retracted from said wall surface.

As a result, the collision of flame or combustion gas in the swirl chamber with the input end of the ignition timing sensor is avoided to restrain the formation of deposits on the input end.

Preferably, the retraction length l of the input end of the ignition timing sensor from the wall surface of the swirl chamber is within the range of $0 \text{ mm} \leq l \leq 10 \text{ mm}$. In the case of $l > 10$ mm, soot may be accumulated on a hole portion from the input end to the wall surface of the swirl chamber during a normal travel of an automobile and a low temperature period of an engine to provide obstructions to the detection of the combustion light. Even if $l \leq 10$ mm, some soot may be accumulated on the point of the input end. This soot is, however, burnt under high engine speed and load when the combustion temperature in the swirl chamber exceeds 600° C.

The above-mentioned and other objects and features of the present invention will become apparent from the following detailed description taken in conjunction with the drawings which indicate one embodiment of the present invention.

DESCRIPTION OF THE PREFERRED EMBODIMENT

Figure 1:
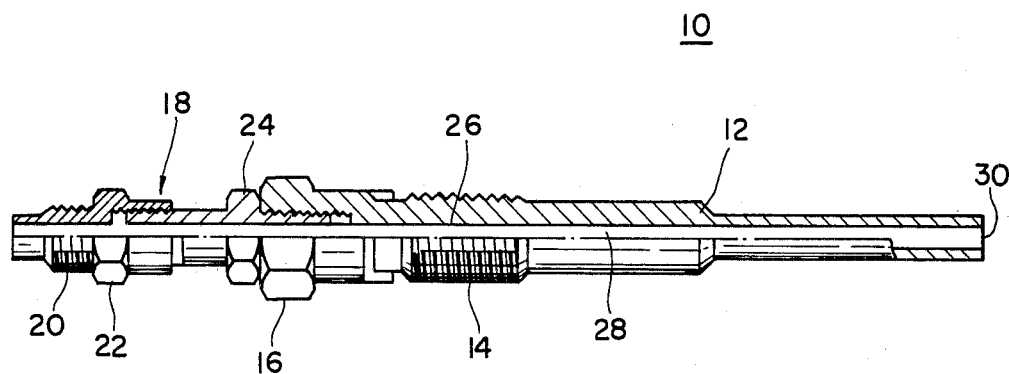
FIG. 1 is a schematic view exemplifying an ignition timing sensor.

FIG. 1 shows an ignition timing sensor 10. A sensor body 12 is formed on the outer periphery with a threaded groove 14 screwed into a cylinder head and a hexagonal portion 16 adapted to engage a tool like a wrench. A connector 18 for an optical fiber is formed with a threaded groove 20 screwed into a corresponding connector and a hexagonal portion 22 adapted to engage a tool and connected to the output end of the sensor body 12 through an interposing member 24. A pin hole 26 is formed along the center axis of the sensor body 12, the interposing member 24 and the connector 18, and an optical fiber 28 extends through the pin hole 26. An end of the optical fiber 28 receives the combustion light at an input end 30.

Figure 2:
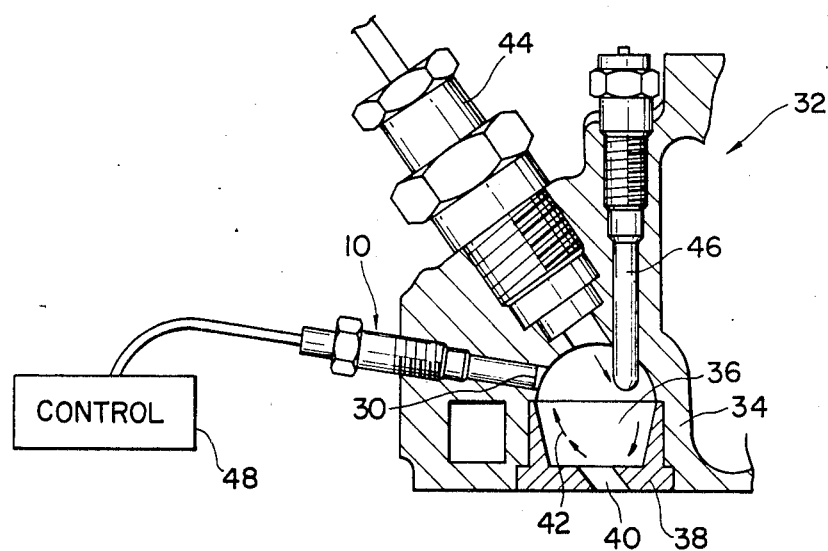
FIG. 2 is a schematic view showing an embodiment according to the present invention.

FIG. 2 shows the condition under which the ignition timing sensor 10 is mounted. In a swirl chamber type Diesel engine 32, a cylinder head 34 is formed with a swirl chamber 36 in the lower portion of which is fitted a defined member 38. A communicating port 40 is formed in the defined member 38 to extend in the tangential direction of the swirl chamber 36 and afford communication between the swirl chamber 36 and a main combustion chamber of a cylinder block. In the compression stroke, air introduced into the swirl chamber 36 through the communicating port 40 forms a swirl shown by the arrows 42. A fuel injection nozzle 44 is mounted on the upper portion of the swirl chamber 36 to inject the fuel along the swirl, and a glow plug 46 is mounted in such a location that the glow portion contacts directly fuel injected from the fuel injection nozzle 44. The ignition timing sensor 10 is mounted on the side of the swirl chamber 36 opposite the glow plug 46 with respect to the fuel injection nozzle 44, and the input end 30 does not project from the wall surface of the swirl chamber 36. Thus, the fuel injected from the fuel injection nozzle 44 does not directly contact said sensor. Assuming the distance between the input end 30 and the wall surface of the swirl chamber 36 is l, it is preferable that l is within the range of $0 \text{ mm} \leq l \leq 10 \text{ mm}$. The combustion light in the swirl chamber 36 detected by the ignition timing sensor 10 is processed in a control unit 48.

Referring to the action of embodiment shown in FIG. 2, the neighborhood of the input end 30 of the ignition timing sensor 10 does not contact directly the fuel injected from the fuel injection nozzle 44 and is located in such a location that soot is almost burnt up when it passes through the sufficient distance to the neighborhood even if the fuel is incompletely burnt, so that the formation of deposits and soot on the input end 30 is restrained. Also, clean air flow from the communicating port 40 in said neighborhood is powerful in the compression stroke and minimize the formation of fuel and other deposits on the input end 30 by the cleaning action for the neighborhood. It is particularly important that the input end 30 is not projected into the swirl chamber 36 and the collision of flame and combustion gas with the input end is to be avoided. Therefore, the formation of deposits on the input end 30 is remarkably restrained.

Figure 3:
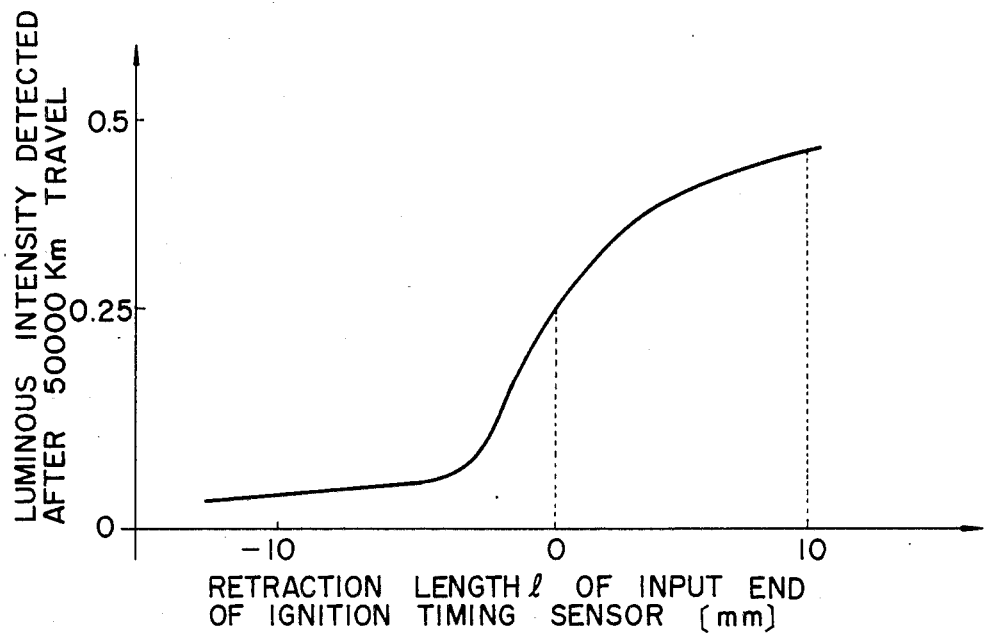
FIG. 3 is a graph illustrating the relationship between the retraction length of the input end of an ignition timing sensor and a luminous intensity detected by the sensor after 50,000 km travel.

FIG. 3 shows the relationship between the distance from the wall surface of the swirl chamber 36 to the input end 30 of the ignition timing sensor 10, i.e., retraction length l of the input end 30, and the detected luminous intensity after 50,000 km travel, assuming the luminous intensity detected by the ignition timing sensor 10 is set at 1.0 before travel. When $l \geq 0$ mm, the formation of deposits on the input end 30 is restrained to ensure that sufficient luminous intensity can be detected.

Figure 4:
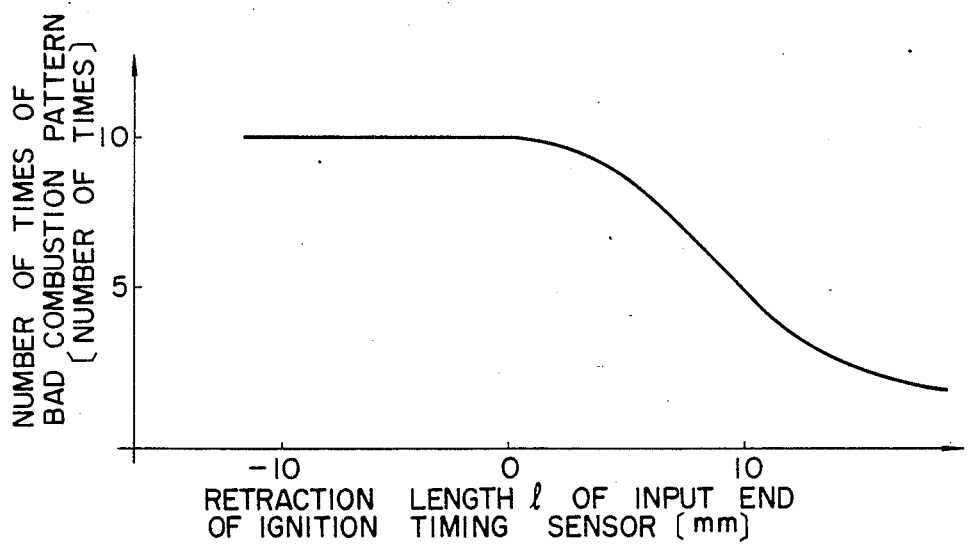
FIG. 4 is a graph illustrating the relationship between the retraction length of the input end of the ignition timing sensor and the number of bad combustion patterns which are carried out until the luminous intensity detected by the sensor becomes zero.

FIG. 4 shows the relationship between the retraction length l and the number of repetitions of combustion patterns of a certain type that must be carried out to make the luminous intensity detected by the ignition timing sensor 10 become zero. The engine is maintained under a low temperature condition and run according to a predetermined bad combustion pattern. When $l > 10$ mm, soot accumulates on the bore from the input end 30 to the wall surface of the swirl chamber 36 to reduce abruptly the luminous intensity to be detected.

What is claimed is:

1. An ignition timing sensor system for use in a Diesel engine having a swirl chamber that connects with a main combustion chamber via a communicating port that directs air from the main combustion chamber into the swirl chamber substantially tangentially to the wall surface of the swirl chamber to swirl the air in a given direction within the swirl chamber, the system comprising:

a fuel injection nozzle opening into said swirl chamber and injecting fuel into said swirl chamber along said given swirl direction;

a glow plug mounted in said swirl chamber and including a glow portion extending into said swirl chamber and contacting said fuel injected into said swirl chamber by said fuel injection nozzle; and an ignition timing sensor mounted in the wall of said swirl chamber and positioned opposite said glow portion of said glow plug with respect to said fuel injection nozzle, said ignition timing sensor including an input end that receives combustion light for sensing ignition timing, and said ignition timing sensor being retracted into said wall of said swirl chamber to prevent said ignition timing sensor from protruding into said swirl chamber.

2. The ignition timing sensor system of claim 1, wherein said glow portion is positioned downstream of said fuel injection nozzle and upstream of said communicating port with respect to said given swirl direction, and said ignition timing sensor is positioned upstream of said fuel injection nozzle and downstream of said communicating port with respect to said given swirl direction.

3. The ignition timing sensor system of claim 1, wherein said input end of said ignition timing sensor is retracted into said wall of said swirl chamber by a distance l from the surface of said wall, said distance l ranging from zero to about ten millimeters.

* * * * *